Feb. 8, 1966 G. N. HOWATT ET AL 3,234,413

THERMOELECTRIC GENERATOR

Filed Oct. 19, 1959 5 Sheets-Sheet 1

INVENTORS
GLENN N. HOWATT
DANIEL S. SCHWARTZ
BY
Cyrus D. Samuelson
ATTORNEY

THERMOELECTRIC GENERATOR

Filed Oct. 19, 1959 5 Sheets-Sheet 2

INVENTORS
GLENN N. HOWATT
DANIEL S. SCHWARTZ
BY
Cyrus D. Samuelson
ATTORNEY

INVENTORS
GLENN N. HOWATT
DANIEL S. SCHWARTZ
BY Cyrus D. Samuelson
ATTORNEY

THERMOELECTRIC GENERATOR
Filed Oct. 19, 1959 5 Sheets-Sheet 4
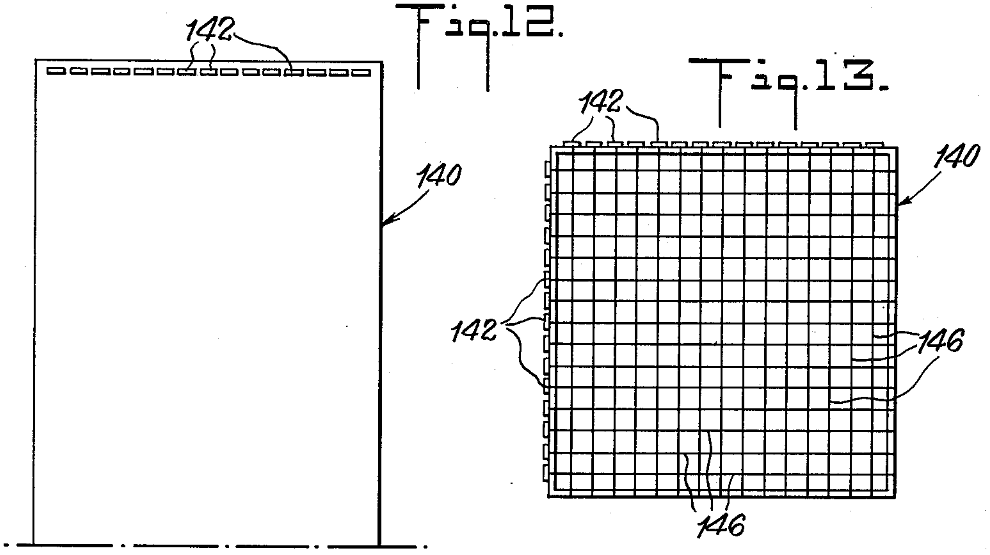
Fig. 12. Fig. 13.
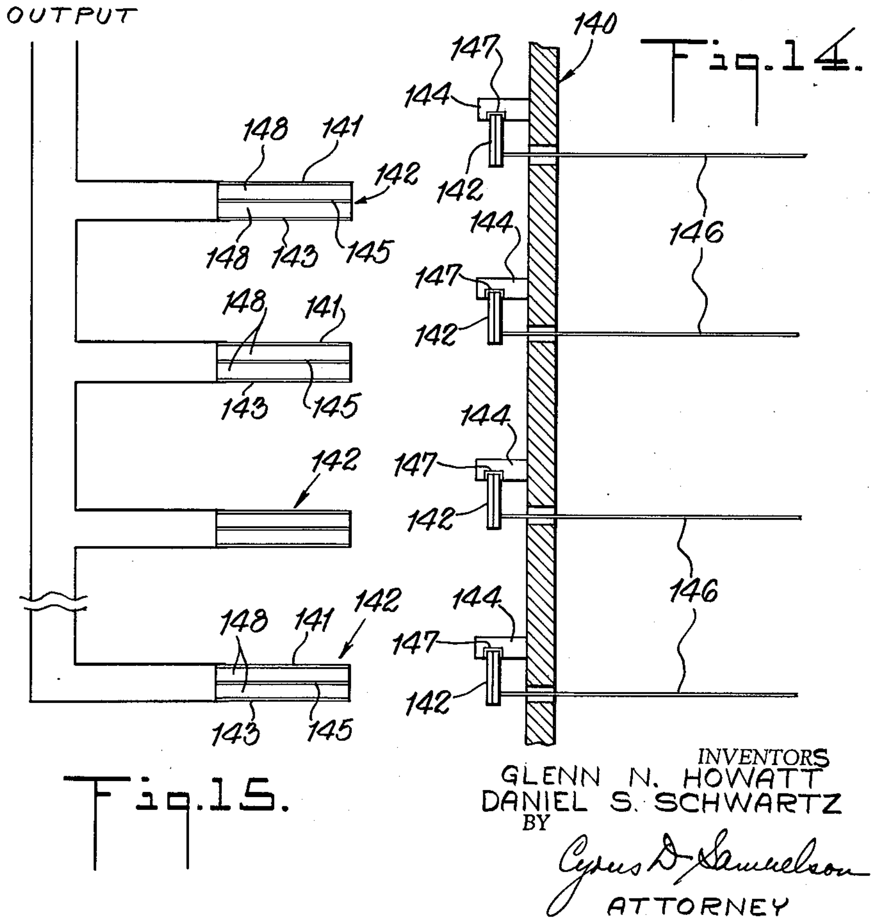
Fig. 14.
Fig. 15.
INVENTORS
GLENN N. HOWATT
DANIEL S. SCHWARTZ
BY
Cyrus D. Samuelson
ATTORNEY Feb. 8, 1966 G. N. HOWATT ETAL 3,234,413

THERMOELECTRIC GENERATOR

Filed Oct. 19, 1959 5 Sheets-Sheet 5

INVENTORS
GLENN N HOWATT
DANIEL S. SCHWARTZ
BY
Cyrus D. Samuelson
ATTORNEY

United States Patent Office 3,234,413

Patented Feb. 8, 1966

3,234,413

THERMOELECTRIC GENERATOR

Glenn N. Howatt, Metuchen, and Daniel S. Schwartz, Nixon, N.J., assignors to Gulton Industries, Inc., Metuchen, N.J., a corporation of New Jersey Filed Oct. 19, 1959, Ser. No. 847,273
13 Claims. (Cl. 310—8.3)

Our invention relates to thermoelectric generators and in particular to such generators which employ electromechanically sensitive bodies.

Thermoelectric generators of our invention are, in one form, comprised of a plurality of stretched wires forming a grid. The ends of the wires are mechanically connected to electromechanically sensitive bodies such that the bodies are under stress when the combination is in a normal temperature environment and from which the stress is partially relieved as the wires expand in the presence of heat energy. While many of the electromechanically sensitive bodies, which may be employed in generators of our invention, are pyroelectric, devices of our invention do not necessarily use this effect. However, as will be seen later in this description, we have invented a thermoelectric generator which makes use of both the piezoelectric and the pyroelectric properties of certain materials. In such generators which constitute one embodiment of our invention, we arrange the structure of the device so that the effects are cumulative. Thermoelectric generators of our invention are intended as auxiliary power units where heat or a temperature change is a by-product of a reaction or where environmental conditions are such that a temperature difference may exist. An example of the former is an industrial smoke stack and an example of the latter is a spinning missile or satellite.

It is an important object of our invention to provide a thermoelectric generator which will produce electrical potential from a change in environmental temperature.

It is a further object of our invention to provide such a generator which is simple and economical to construct.

Figures 1, 2, 3:
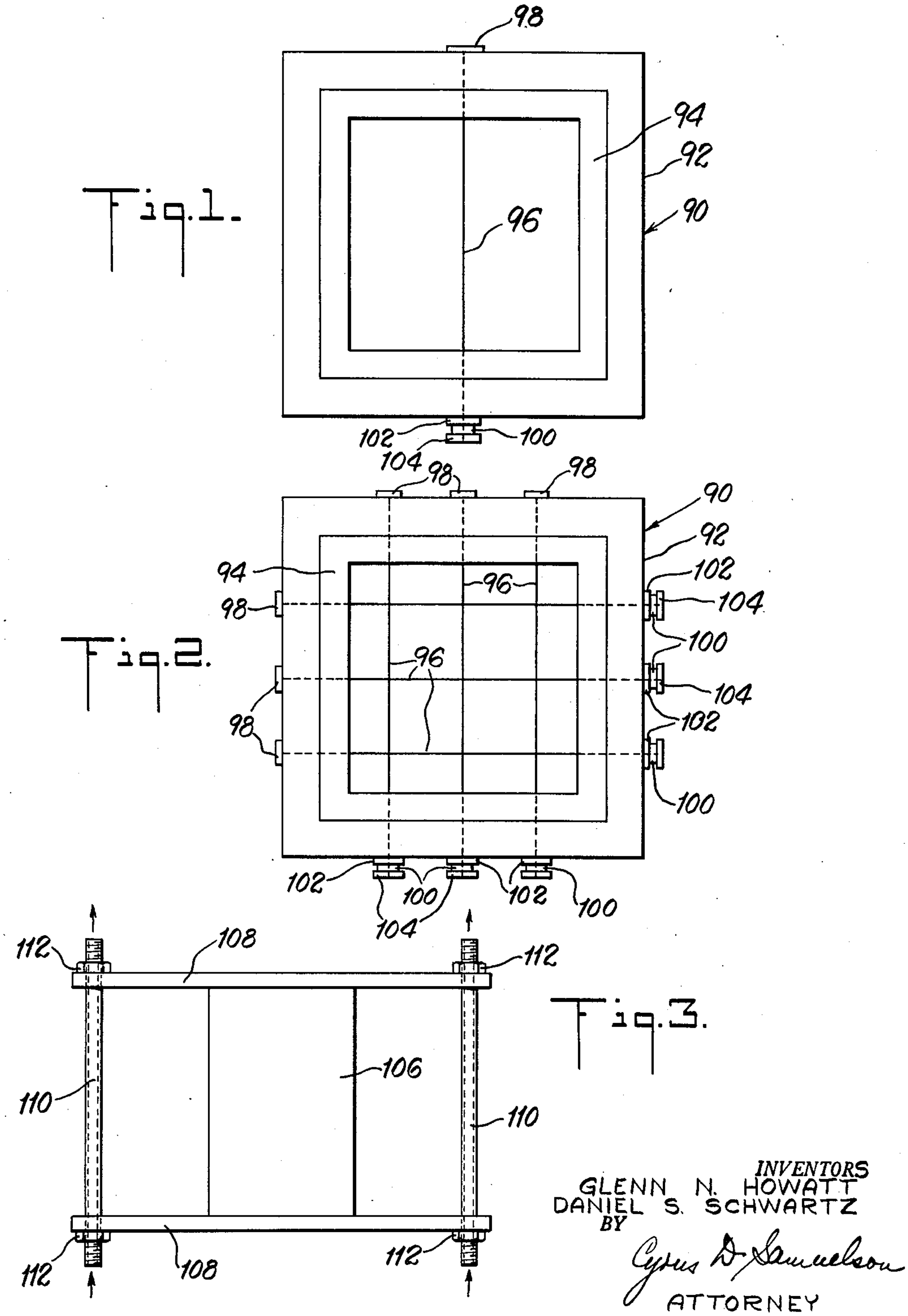
Figure 4:
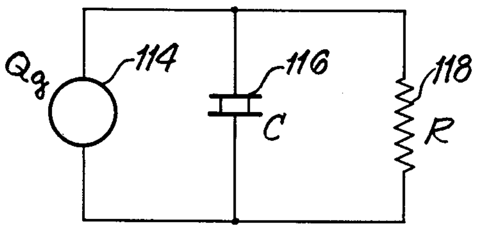
Figure 5:
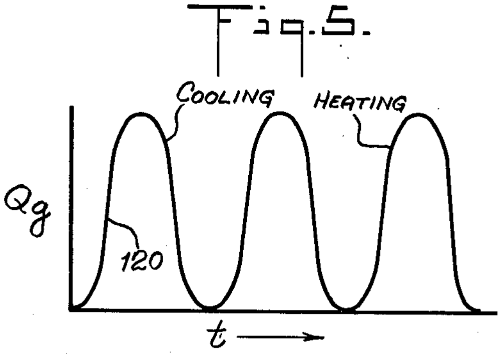
Figure 6:
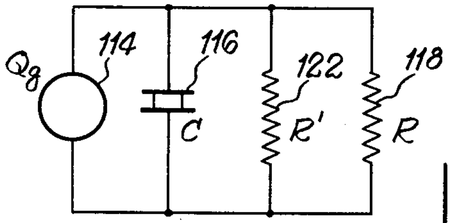
Figure 7:
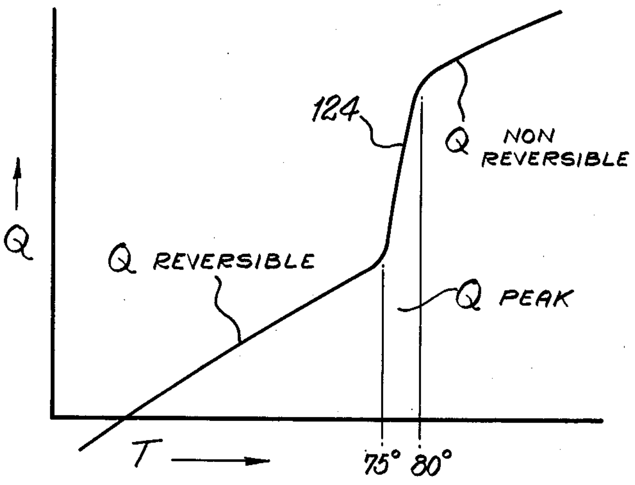
Figure 8:
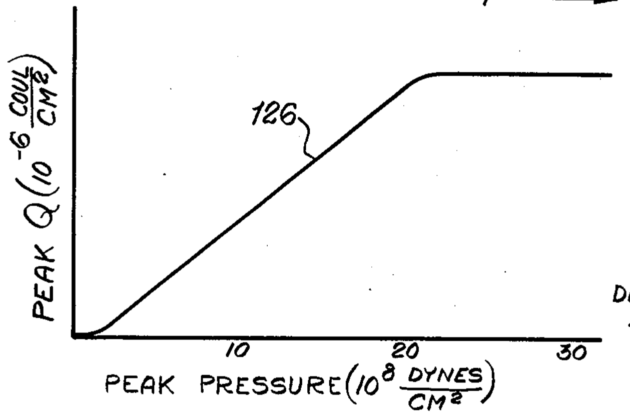
Figures 9A, 9B, 9C, 10A, 10B, 10C, 11A, 11B, 11C:
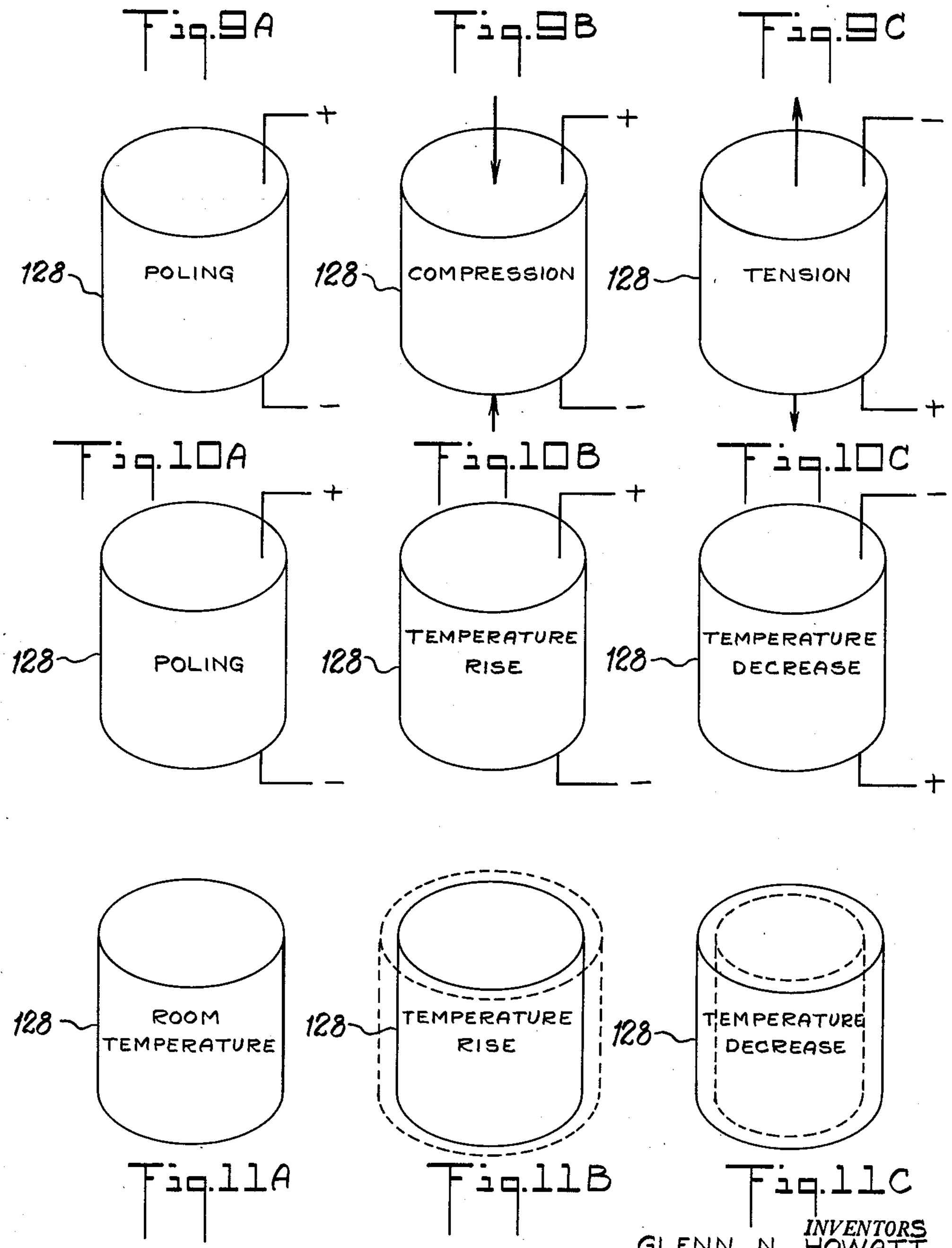
Figures 14A, 14B:
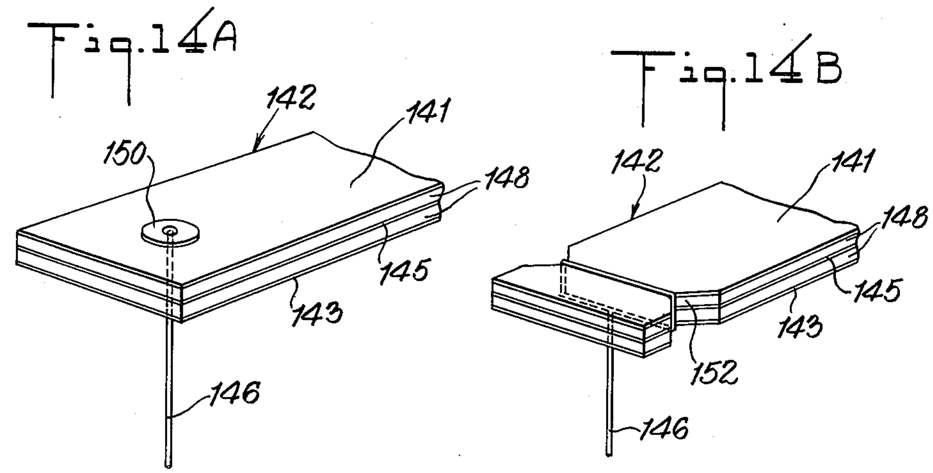
Figure 16:
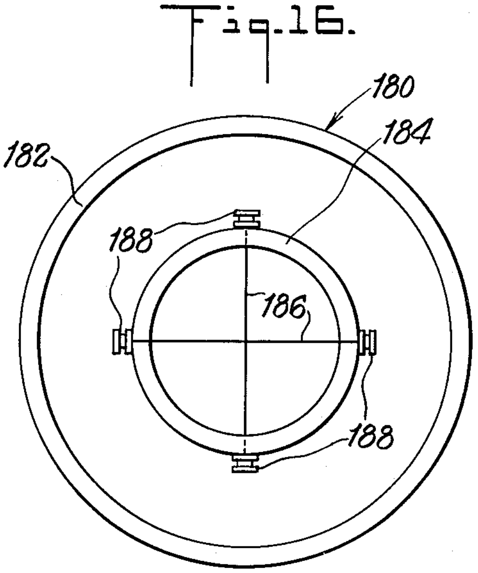
Figure 17:
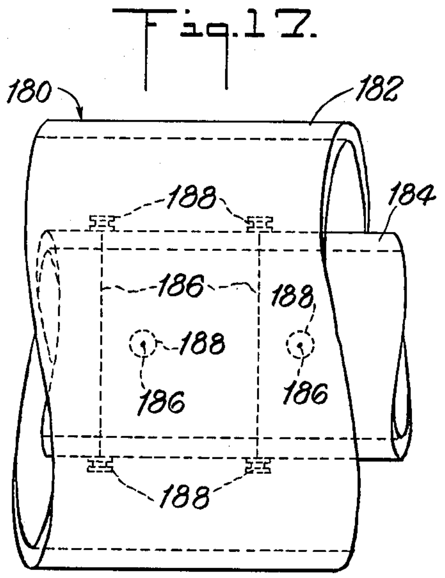

These and other objects, features, uses and advantages will be apparent during the course of the following description when taken in conjunction with the accompanying drawings wherein:

FIGURE 1 is a plan view illustrating the principle underlying a preferred embodiment of our invention, FIGURE 2 is a plan view of a basic embodiment of thermoelectric generator of our invention using the principles of FIGURE 1, FIGURE 3 is an elevational view of a further basic embodiment of thermoelectric generator of our invention, FIGURE 4 is a simplified schematic diagram illustrating the pyroelectric effect, FIGURE 5 is a plot of charge out against time for the circuit of FIGURE 4, FIGURE 6 is a diagram similar to that of FIGURE 4 showing the effect of the insulation resistance of the ceramic element, FIGURE 7 is a plot of charge against temperature for a barium titanate-lead titanate body, FIGURE 8 is a plot of peak charge release against peak pressure for a lead titanate-zirconate ceramic body, FIGURES 9A, 9B and 9C illustrate the polarity of the piezoelectric output with respect to the poling polarity under compression and tension, FIGURES 10A, 10B and 10C illustrate the polarity of the pyroelectric output due to temperature rise and temperature decrease with respect to the poling polarity, FIGURES 11A, 11B and 11C illustrate the dimensional changes of a ceramic element due to changes in temperature, FIGURE 12 is an elevational view of a preferred embodiment of thermoelectric generator of our invention, shown mounted on a heat exhaust stack, FIGURE 13 is a plan view of the embodiment of FIGURE 12, FIGURE 14 is a view similar to FIGURE 13, greatly enlarged, showing the mechanical connections between the stretched wires and the electromechanically sensitive bodies, FIGURES 14A and 14B illustrate two methods for mechanically affixing the wire to the electromechanically sensitive body, FIGURE 15 is a schematic diagram showing a preferred method for electrically connecting the electromechanically sensitive bodies, FIGURE 16 is an end elevational view illustrating a further embodiment of thermoelectric generator of our invention which makes use of the combination of the pyroelectric and piezoelectric effects, and FIGURE 17 is a side elevational view, broken away, of the embodiment of FIGURE 16.

We prefer to form the electromechanically sensitive bodies from ferroelectric ceramic materials such as lead titanate-zirconate but other ferroelectric materials or types of electromechanical transducers may also be employed. The materials such as lead titanate-zirconate lend themselves for use in generators of our invention because they possess higher piezoelectric and pyroelectric moduli than other materials such as the barium titanate ceramics and are not materially affected at the temperatures at which generators of our invention are used. Other ceramics which cannot be used in relatively high temperature environments are not as usable as the lead titanate-zirconate bodies because ceramics which tend to become depolarized at the working temperature of the device will be rendered inoperative. The electromechanically sensitive bodies may be fashioned in the form of ceramic sandwiches with an electrode between the two ceramic elements and an electrode on the outer surface of each ceramic element or other forms of electromechanical transducers such as pills or rods may also be used. Furthermore, the natural piezoelectrics, other artificial piezoelectrics, polarized electrostrictives or magnetostrictives may be employed as the active electromechanical elements in the thermoelectric generators of our invention.

Our invention is based, in part, on the theory that when a piezoelectric element is stressed or unstressed it produces an electrical charge which, when varied with respect to time, produces a current. Upon application of this current to a load, a useful voltage is obtained. Let us first consider single wire 96 which is stretched and mechanically connected to piezoelectric element 100 such that the piezoelectric element is under stress at the normal temperature of the environment (FIGURE 1). Housing 90 comprises frame 92 of steel or similar material within which is placed insulator 94 of asbestos or similar material. Wire 96 is affixed to the frame by means of clamp 98 and is connected to piezoelectric element 100 so that the wire is under stress at room temperature. Piezoelectric element 100 is insulated from frame 92 by means of insulator 102 and is kept in position by means of loading plate 104. It is important that the wire be put under an initial stress since heating the wire will tend to relieve the stress on the piezoelectric element. If we assume that the material selected for the piezoelectric element requires a pressure of $$9\times10^{8}\frac{\text{dynes}}{\text{cm.}^2}$$

to obtain a charge density of $$6.5\times10^{-6}\frac{\text{coul}}{\text{cm.}^2}$$

and we further consider the piezoelectric element to be a pill one centimeter long having an electroded surface area equal to one square centimeter, we obtain the following results:

Since $$Y=\frac{F/A}{\Delta l/l}=\frac{Fl}{\Delta lA}$$

where $Y$=Young's modulus
$F$=the force applied
$A$=the area of the piezoelectric electroded surface
$l$=the length of the piezoelectric element or $$\frac{F}{A}=Y\frac{\Delta l}{l}$$

We desire $F/A$, to be equal to $$9\times10^{-8}\frac{\text{dynes}}{\text{cm.}^2}$$

so that $$\Delta l=\frac{Fl}{AY}=9\times10^{-8}\frac{l}{Y}$$

Since $l=1$ cm. and Y is approximately equal to $$8\times10^{11}\frac{\text{dynes}}{\text{cm.}^2}$$

we get $$\Delta l=\frac{9\times10^{8}\times1}{8\times10^{11}}=1.13\times10^{-3}\text{ cm.}$$

If we use a steel wire 10 cm. in length and assume the coefficient of expansion $\alpha$ of steel to be approximately equal to $9\times10^{-6}$ cm. per ° C., the change in length of the wire $\Delta l_W$ is given by: $\Delta l_W=(\alpha\Delta T-P/Y)l_W$ where $l_W$=the length of the wire
$\Delta T$=the change in temperature
$P$=the pressure or force per unit area
$Y$=Young's modulus From the above, $\Delta l_W$ should be equal to $1.13\times10^{-3}$ cm.

Then $$\alpha\Delta T=\frac{\Delta l_w}{l_w}+\frac{P}{Y}$$

$$\Delta T=\frac{0.113\times10^{-3}\times1.13\times10^{-3}}{9\times10^{-6}}=137°\text{C.}$$

To determine the wire area that can support this load, assume a yield point of the wire of $10^5$ p.s.i. and a safety factor of 2 or $5\times10^4$ p.s.i. (about $3\times10^8$ dynes per cm.$^2$). The cross-sectional area and diameter of the wire is found as follows:

$$A=\frac{9\times10^{8}}{30\times10^{8}}\cong0.3\text{ cm.}^2=\frac{\pi d^2}{4}$$

$$d^2=\frac{1.2}{\pi}=0.382\text{ cm.}^2$$

$$d=0.62\text{ cm.}\cong\tfrac{1}{4}''$$

To find the efficiency of conversion of the system, E, which is defined as follows:

$$E=\frac{\text{Electrical energy out}\times100}{\text{Heat energy in}}$$

we get $$E=\frac{Q^2/2C}{MC_{\text{sp}}\Delta T}\times100$$

where $Q$=charge output
$C$=capacitance of the piezoelectric element
$M$=mass of the wire
$C_{SP}$=specific heat of the wire=0.107
$\Delta T$=change of temperature of the wire=137° C.

Since $$C=\frac{ke_oA}{d}$$

we have for the sample chosen:
$C=500(8.854\times10^{-14})=45\times10^{-12}$ farads so that $$E=\frac{39\times10^{-12}\times10^{2}}{2(45\times10^{-12})\,(8)\,(.3)\,(10)\,(.107)\,(4.18)\,(137)}=.03\%$$

This efficiency can be increased in the following manner:

(1) Use of an element which releases more charge at lower stress values would increase efficiency. Further, assuming that all other quantities remained constant, a lower dielectric constant and Young's modulus would also tend to increase the efficiency of conversion.

(2) When wire with a low specific heat is used, less heat is required for a specific temperature use.

(3) When wire with a higher yield point is used, a thinner wire may be employed for the same force range.

(4) With wire having a higher coefficient of expansion, a smaller temperature change is needed to produce the same strain.

Some consideration on other wire materials to be used in the system, indicates that the use of tungsten gives a factor of 3 to 4 increase in the efficiency of conversion over the use of steel.

The method just described lends itself to use in the embodiment of FIGURE 2 wherein the piezoelectric elements are mounted on the periphery of the stack and a plurality of wires are stretched over the stack and affixed to the elements as shown in FIGURE 1. The electrical connections to obtain a combined output from the elements are made as shown in FIGURE 15.

In FIGURE 3 there is shown a further basic embodiment of thermoelectric generator of our invention wherein piezoelectric element 106 is mounted between two stress plates 108 which place the element under stress at normal temperature. Jig screws 110, which hold the combination together, are threaded and held in place by nuts 112 applied at each end of screws 110. The jig screws are hollow and the fluid flows through them in the direction of the arrows in the figure. When the fluid is hot, the screws expand in length and the stress on the piezoelectric element is reduced. When cold fluid flows through the screws, they contract in length and the stress on the piezoelectric element is increased. This embodiment is best for operation with alternating hot and cold fluid flow. The piezoelectric element is heat insulated from the jig screws so that its temperature does not change appreciably. Therefore, the capacitance remains constant through the range of forces and the efficiency of conversion will be of the same order of magnitude as previously calculated.

In the embodiments described above the electrical connections to the bodies are not shown nor are the electrodes shown. However, the usual electrodes and electrical connections thereto are used in order to obtain an electric output potential. The electrodes and electrical connections are affixed in the manner well-known in the art.

While thermoelectric generators of our invention do not necessarily use the pyroelectric effect, we have found that it is possible to increase the efficiency of these generators by using both the pyroelectric and the piezoelectric effects together. We shall now discuss the pyroelectric effect and thereafter shall discuss the effect obtained when the pyroelectric effect is combined with the piezoelectric effect. In certain materials, a temperature change produces a charge release or voltage output. Mathematically, pyroelectricity is a relation between temperature and polarization and physically, pyroelectricity is the change with temperature of positive and negative polarization charges on certain portions of the crystals of the materials. The pyroelectric coefficient, which we shall define as W, has the dimensions of an electric moment per unit volume per degree temperature change. Thus, $$W=\text{pyroelectric coefficient}=\frac{U}{\text{Vol}\times T}$$

where U is the dipole moment in coulomb centimeters, Vol is the volume in cubic centimeters and T is the temperature in ° C. Therefore, the units of W are coulombs per square centimeter per degree C. We have found the pyroelectric coefficient of a lead titanate-zirconate body having a Curie points of 375° C. to be linear up to 250° C. and to have a value of $2.8\times10^{-8}$ coul/cm.$^2$/° C., whereas for a barium titanate-lead titanate body with a Curie point of 130° C., we have found it to be linear up to about 80° C. and to have a value of $1.2\times10^{-8}$ coul/cm.$^2$/° C.

To find the output voltage from a given element due to the pyroelectric effect, we have:

$$B=\frac{WA}{C}\Delta T$$

whose units are $$\frac{\text{coul}}{\text{cm.}^2\ ^\circ\text{C}}\times\text{cm.}^2\times{}^\circ\text{C}\times\frac{1}{\text{farad}}=\frac{\text{coul}}{\text{farad}}$$

where $B$=the output voltage from a given element of a given size
$W$=the pyroelectric coefficient
$A$=the electroded area of the element
C=the capacity of the element
$\Delta T$=the change in temperature Since a volt is defined as a coulomb per fared, B is given in volts. For a parallel plate capacitor $$C=\frac{ke_oA}{d}$$

where $k$=the relative dielectric constant
$e_0$=the permitivity of free space
$d$=the distance between the electrodes=the thickness and we get:

$$B=\frac{WA\Delta T}{C}=\frac{WA\Delta Td}{ke_oA}=\frac{Wd\Delta T}{ke_o}\text{ volts}$$

Now the efficiency, E, is found as follows:

$$E=\frac{\text{Electrical energy out}}{\text{Heat energy in}}=\frac{\frac{1}{2}CV^2}{MC_{SP}\Delta T}$$

where $V=B$=voltage output
$M$=the mass of the element
$C_{SP}$=the specific heat of the sample so that $$E=\tfrac{1}{2}\frac{ke_oA}{d}\left(\frac{W^2d^2(\Delta T)^2}{k^2e_o^2}\right)\frac{1}{WC_{SP}\Delta T}=\tfrac{1}{2}\frac{AW^2d\Delta T}{ke_oMC_{SP}}$$

which expression is dimensionless and can be used to measure the efficiency of conversion from heat energy to electrical energy in a pyroelectric material. When the expression is multiplied by 100, the efficiency is given in percent. Since $M=\rho Ad$ where $\rho$=the density, we get $$E=\tfrac{1}{2}\frac{AW^2d\Delta T}{ke_o\rho AdC_{SP}}=\tfrac{1}{2}\frac{W^2\Delta T}{ke_o\rho C_{SP}}$$

and we find that E is independent of the size of the element.

As the temperature of a pyroelectric element is increased, the polarization decreases and some bound charges become freed. For open circuit conditions and high insulation resistance of the ceramic, this unbound charge accumulates at the electrodes until peak temperature is attained. Upon cooling, the polarization increases until at the original temperature, all the charge again becomes bound.

Practically, we must know whether the energy is to be used continuously or stored. For storage, only d.c. is practical for long periods. For a resistive load, the output of the pyroelectric element must be rectified. By using multiple rectifiers in simple bridge circuits, both the heating and cooling cycles of the pyroelectric element may be utilized. Storage on a capacitor is not easy to achieve. Maximum energy is transferred when both generating and storage capacitors are equal in value. Each half cycle of temperature change charges the storage capacitor as fully as is possible. The generated charge is twice that delivered $$\left(C_oV_o=C_1V_1,\ \therefore Q_1=\frac{Q_o}{2}\right)$$

and thus the energy in the storage capacitor is only ¼ of that generated $$\left(\frac{Q^2}{2C};\ Q_1=\frac{Q_o}{2}\right)$$

For continuous use of the energy generated, the load may be connected across the pyroelectric element and for a purely resistive load we have the equivalent circuit shown in FIGURE 4. In FIGURE 4, 114 designates $Q_g$=the instantaneous value of generated charge, 116 designates $C$=the pyroelectric element (capacitor), and 118 designates $R$=the load resistance.

The plot of charge out against time for this condition is shown in FIGURE 5. Curve 120 of FIGURE 5 can be represented as follows: $Q_g=Q_{max}\sin^2\omega t$. The current through the load is then the difference between the rate of charge generation and the rate of increase of charge on the capacitor or $$i=\frac{dQ}{d_2}=\frac{dQ_g}{dt}-\frac{dQ_s}{dt}=\frac{Q_s}{RC}$$

where $Q_g$=the charge generated
$Q_s$=the charge stored
$Q_{max}$=the peak generated charge
$\omega$=the angular frequency of temperature variation
$t$=the time
$i$=the current through load resistance
$R$=the load resistance
$C$=the generating capacitance Now $$\frac{dQ_g}{dt}=2\omega Q_{max.}\sin\omega t\cos\omega t$$

using $\sin 2\omega t=2\sin\omega t\cos\omega t$
we obtain $$\frac{dQ_g}{dt}=Q_{max.}\omega\sin 2\omega t$$

Thus $$\frac{dQ_s}{dt}+\frac{Q_s}{RC}=Q_{max.}\omega\sin 2\omega t$$

The solution of this equation with arbitrary constant A is:

$$Q_s=Q_{max.}\omega RC\frac{(\sin 2\omega t-2\omega RC\cos 2\omega t)}{1+(2\omega RC)^2}+Ae^{\frac{-t}{RC}}$$

at $t=0$, $Q_s=0$ and therefore $$A=\frac{2Q_{max.}(\omega RC)^2}{1+(2\omega RC)^2}$$

and $$Q_s=\frac{Q_{max.}\omega RC}{1+(2\omega RC)^2}\left(\sin 2\omega t-2\omega RC\cos 2\omega t+2\omega RCe^{\frac{-t}{RC}}\right)$$

Thus, the voltage is $$V=\frac{Q_s}{C}=\frac{Q_{max.}\omega R\not{C}\left(\sin 2\omega t-2\omega R\cos 2\omega t+2\omega RCe^{\frac{-t}{RC}}\right)}{\not{C}[1+(2\omega RC)^2]}$$

and the load current is $$i=\frac{Q_s}{RC}=\frac{V}{R}=\frac{Q_{max.}\omega\left(\sin 2\omega t-2\omega RC\cos 2\omega t+2\omega RCe^{\frac{-t}{RC}}\right)}{1+(2\omega RC)^2}$$

Under steady state conditions, we drop the exponential term and obtain $$V=\frac{Q_{max.}\omega R\sin(2\omega t-\tan^{-1}2\omega RC)}{(1+(2\omega RC)^2)^{1/2}}$$

$$i=\frac{Q_{max.}\omega\sin(2\omega t-\tan^{-1}2\omega RC)}{(1+(2\omega RC)^2)^{1/2}}$$

Then the peak power is $$W=Vi=\frac{Q^2_{max.}\omega^2R}{1+(2\omega RC)^2}$$

This is the maximum for a given choice of capacitance and frequency by equating the load resistance and the capacitance reactance. Note here that the effective frequency is twice that of the temperature variation. Thus for maximum power, we have:

$$R=\frac{1}{2\omega C}$$

At this value of R the maximum power is given by:

$$W=\frac{Q^2_{max.}\omega^2R}{1+(2\omega RC)^2}$$

which becomes $$W=\frac{Q^2_{max.}\omega}{4C}$$

Consider now the pyroelectric coefficient which we have discussed previously where:

$L$=the pyroelectric coefficient (coul/cm.²/° C.)
$A$=the area of the electrodes
$\Delta T$=the maximum temperature change Now $$C=\frac{ke_oA}{d}=\frac{eA}{d}$$

where $k$=the relative dielectric constant
$e_0$=the permittivity of free space
$d$=the thickness between the electrodes and $e=ke_0$
Thus $$Q_{max.}=LA\Delta T=\frac{CdL\Delta T}{e}$$

Then the peak power becomes:

$$W=\frac{Q^2_{max.}\omega}{4C}=\frac{C^2d^2L^2(\Delta T)^2}{e^24C}=\frac{eAd^2L^2(\Delta T)^2}{4de^2}=\frac{L^2(\Delta T)^2\omega}{4e}(Ad)$$

or $$W=\frac{L^2(\Delta T)^2(\text{Vol})}{8eRC}$$

where we have used the condition $$R=\frac{1}{2\omega C}$$

or $$\omega=\frac{1}{2RC}$$

It is evident that for the greatest power transfer we should have:

$\omega$ as large as possible
$\Delta T$ large
$L$ large
Volume large
$e$ small

The voltage and current for this condition of maximum power are:

$$V=\frac{LA\Delta T\omega R}{(1+(2\omega RC)^2)^{1/2}}=\frac{LA\Delta TR}{2C(2)^{1/2}R}=\frac{LA\Delta Td}{2eA(2)^{1/2}}=\frac{L\Delta Td}{2(2)^{1/2}e}$$

and $$i=\frac{LA\Delta T\omega}{(1+(2\omega RC)^2)^{1/2}}=\frac{LA\Delta T\omega}{(2)^{1/2}}$$

or $$W=\frac{L^2(\Delta T)^2\omega}{4e}\text{ Volume};\ V=\frac{L\Delta Td}{2(2)^{1/2}e};\ i=\frac{L\Delta T\omega A}{(2)^{1/2}}$$

The power output (peak) per unit volume becomes:

$$\frac{W}{\text{Volume}}=\frac{L^2(\Delta T)^2\omega}{4e}$$

and the output per unit mass becomes:

$$\frac{W}{\text{Mass}}=\frac{L^2(\Delta T)^2}{4e\rho}\text{ from }\frac{W}{\text{Volume}}\times\frac{1}{(\text{mass/vol})}=\frac{W}{\text{Mass}}$$

As we note from the preceding formulas, it is preferable to operate to as high temperatures as is possible. At these temperatures, the insulation resistances of some of the piezoelectric ceramics fall rapidly. This insulation resistance of the ceramic can be represented as shunting load resistor 122 (R′) in which useless energy is dissipated as shown in FIGURE 6. R′ is the insulation resistance of the element C at temperature T.

The ideal situation occurs when the insulation resistance far exceeds the load resistance $$\left(\frac{R'}{R}\gg 1\right)$$

If we assume that the insulation resistance of the pyroelectric capacitor is twenty times that of the load resistor then:

$$\frac{R'}{R}=20=2\omega CR'$$

from $$R=\frac{1}{2\omega C}$$

Thus $$\omega=\frac{10}{CR'}$$

or $$f=\frac{1.6}{CR'}$$

where $f$=the frequency of temperature variation $R'$=the insulation resistance of the ceramic at temperature T $CR'$=the inherent time constant of the pyroelectric ceramic This frequency is the rate at which the pyroelectric material must be cycled in temperature to prevent serious leakage within the pyroelectric element itself. Rapid temperature changes of the order of 225° C. may entail problems of thermal shock. It may be expected that thin ceramic sheets will give no thermal shock problems in the temperature range under consideration.

We shall now consider a specific example using the lead titanate-zirconate ceramic previously described. A virtue of the pyroelectric ceramics is that they can operate with little loss of effectiveness down to very low temperatures in contrast to semiconductor materials whose usefulness decreases rapidly at low temperatures. For this ceramic:

$$L=2.8\times10^{-8}\text{ coul/cm.}^2/°\text{ C.}$$
$$e=ke_0=8.854\times10^{-11}\text{ farad/cm.}$$

as $k_{RT}=500$ and $k_{250°\text{ C.}}=1500$; $k_{av}=10^3$ and $\rho=7.3$ gms/cm.³.

We must now consider the R'C factor which was previously discussed.

Now $$(R'C)_{25°\text{ C.}}=5\times10^{10}\times5\times10^{-10}\cong25\text{ sec.}$$

and $$(R'C)_{250°\text{ C.}}=6\times10^{7}\times15\times10^{-10}\cong.01\text{ sec.}$$

For $$\frac{R'}{R}\cong10,\ f=\frac{0.8}{R'C}$$

Then $$f_{25°\text{ C.}}\cong0.03\text{ c.p.s. and }f_{250°\text{ C.}}\cong80\text{ c.p.s.}$$

This can be improved by modifying pure lead titanate-zirconate by adding minor amounts of some rare earth compounds. The insulation resistances of this improved ceramic at 250° C. are over 100 times that of the purer lead titanate-zirconate ceramic. It is not unreasonable to expect a time constant at 250° C. of the order of 1 c.p.s. Higher frequencies would present difficulties in achieving the 225° C. rapid temperature change. We thus take $f=1$ c.p.s. or $\omega=2\pi f=6.28$ rad/sec.

The power output is then calculated from:

$$\frac{W}{\text{Mass}}=\frac{L^2(\Delta T)^2\omega}{4e};\ \frac{W}{\text{Volume}}=\frac{L^2(\Delta T)^2\omega}{4e}$$

thus $$\text{watts/cm.}^3=\frac{L^2(\Delta T)^2\omega}{4e}$$

$$\frac{\text{watts}}{\text{cm.}^3}=\frac{(2.8\times10^{-8}\text{ coul/cm.}^2/°\text{ C.})^2(225°\text{ C.})^2 6.28/\text{sec.}}{4(8.854\times10^{-11})\text{ farad/cm.}}$$
$$=\frac{7.85\times10^{-16}\times5.1\times10^4\times6.28}{354\times10^{-12}}\ \frac{\text{coul}^2°\text{ C.}^2\text{ cm.}}{\text{cm.}^4°\text{ C.}^2\text{ sec. farad}}$$
$$=0.71\ \frac{\text{coul}^2}{\text{farad sec. cm.}^3}$$

Now $$1/\text{farad}=\frac{\text{kgm}^2}{\text{sec.}^2\text{ coul}^2}$$

and therefore:

$$\frac{\text{coul}^2}{\text{farad sec.}}=\frac{\text{coul}^2\text{ kgm}^2}{\text{sec.}^2\text{ coul}^2}=\frac{\text{kgm}^2}{\text{sec.}^3}=\text{watt}$$

and we obtain $$\frac{W}{\text{Volume}}=0.71\ \frac{\text{watt}}{\text{cm.}^3}$$

To obtain $$\text{watts/ft}^3\ 0.71\ \frac{\text{watt}}{\text{cm.}^3}\left(2.54\ \frac{\text{cm.}}{\text{in.}}\right)^3\left(12\ \frac{\text{in.}}{\text{ft.}}\right)^3=$$
$$0.71\times16.4\times1728$$

and $$\frac{\text{watts}}{\text{volume}}\cong20\text{kw/cu. ft.}$$

To put the results in terms of mass, we use the formula:

$$\frac{W}{\text{Mass}}=\frac{L^2(\Delta T)^2\omega}{4e\rho}$$

Thus $$0.71\ \frac{\text{watts}}{\text{cm.}^3}\times\frac{1\text{ cm.}^3}{7.2\text{ gms.}}=0.098\text{ watts/gm.}$$

and $$0.098\ \frac{\text{watts}}{\text{gm.}}\times453.7\ \frac{\text{gms.}}{\text{lb.}}\cong45\text{ watts/lb.}$$

The output voltage is obtained from $$\frac{V}{d}=\frac{L\Delta T}{2(2)^{1/2}e}$$

or $$\frac{V}{d}=\frac{2.8\times10^{-8}\text{ coul/cm.}^2°\text{ C.}(225°\text{ C.})}{2(2)^{1/2}(8.854\times10^{-11}\text{ farad/cm.})}=2.5\times10^4\ \frac{\text{volts}}{\text{cm.}}=$$
$$25{,}000\ \frac{\text{volts}}{\text{cm.}}$$

Then for an element 0.010" thick, we would have about 635 volts and for an element 0.005" thick, we would obtain voltage of the order of 315 volts.

For an electroded area of 1,350 cm.² which is equivalent to a capacitance of 10 microfarads we find R'C=0.8 or $$R'=\frac{0.8}{C}=\frac{0.8}{10^{-5}}\cong80{,}000\text{ ohms}$$

and if $$\frac{R'}{R}=10$$

then the load resistance must be 8,000 ohms.

The efficiency of 0.06% average which we have obtained is somewhat low but the output per unit mass or volume is quite substantial.

We shall now examine an alternate method of pyroelectric conversions.

At low temperature, if a cold source is available, we obtain the following advantages: one, dielectric constant decreases; two, insulation resistance increases and thus the efficiency of conversion increases.

One of the strongest limitations of the instant technique resides in the difficulty of changing temperatures rapidly. Using a value of $$2.5\times10^{-3}\ \frac{\text{cal}}{\text{sec. }°\text{ C. cm.}}$$

for the thermal conductivity of the ceramic material, it is found (Brown & Marco—"Introduction to Heat Transfer," McGraw-Hill, 1951) that the center of a 0.010" thick plate initially at 25° C. throughout and suddenly altered to 250° C. at the surface, rises to 230° C. within 0.05 sec. We have assumed a figure of 1 c.p.s. or 0.50 sec. heating and 0.50 sec. cooling. If the frequency of temperature variation can be increased substantially, the power output will rise proportionately and the required load resistance will fall. It is now our object to consider an alternate embodiment after the following introduction to it.

The pyroelectric coefficient of lead titanate-zirconate has been previously determined as $$2.8\times10^{-8}\ \frac{\text{coul}}{\text{cm.}^2°\text{ C}}$$

The average charge output upon destruction is about $$12\text{ to }14\ \frac{\text{microcoulombs}}{\text{cm.}^2}$$

It is immaterial if this be removed by force (piezoelectric) or temperature (pyroelectric) means. At 250° C. it is expected that $$(250°\ \text{C}-25°\ \text{C.})\times 2.8\times 10^{-8}\ \frac{\text{coul}}{\text{cm.}^2\,°\,\text{C}}\cong 6.3\times 10^{-6}\ \frac{\text{coul}}{\text{cm.}^2}$$

has been removed from the material due to the pyroelectric effect. Determination of the charge release upon a destructive impact at this temperature gives from 5 to 7 microcoulombs/cm.$^2$. Consider cycling this material from room temperature ($\cong$25° C.) to a temperature above its Cure point ($\cong$375° C.). On the basis of the pyroelectric coefficient, a charge of $$(375°\ \text{C}-25°\ \text{C.})\times 2.8\times 10^{-8}\ \frac{\text{coul}}{\text{cm.}^2\,°\,\text{C}}=9.8\times 10^{-6}\ \frac{\text{coul}}{\text{cm.}^2}$$

is expected to be released. As it is immaterial if all the charge available ($\cong$12 to 14 microcoulombs/cm.$^2$ be removed by pyroelectrical or piezoelectrical means, we must interpret this data to mean that the pyroelectric coefficient of the material is non-linear (at least above 250° C.) and of a value $$>2.8\times 10^{-8}\ \frac{\text{coul}}{\text{cm.}^2\,°\text{C.}}$$

at some or all points above this temperature.

In FIGURE 7 (curve 124 is for barium titanate-lead titanate)

$L$ ($Q$ Reversible)$\cong 1.2\times 10^{-8}$ coul/cm.$^2$/° C.

$L$ ($Q$ Peak)$\cong 20\times 10^{-8}$ coul/cm.$^2$/° C.

$L$ ($Q$ Nonreversible)$>1.2\times 10^{-8}$ coul/cm.$^2$/° C.

Note that in the Q Peak region L is very high.

We expect the above type of results to hold for the lead titanate-zirconate ceramic. We shall take in the Q Peak region $$L\cong 20\times 10^{-8}\ \frac{\text{coul}}{\text{cm.}^2\,°\,\text{C.}}$$

in a 5° temperature range. Also, we can cycle temperature-wise much faster for a 5° C. temperature interval than for a 250° C. interval. Thus, assume $f=50$ c.p.s. Then $$\frac{W}{\text{Volume}}=\frac{L^2(\Delta T)^2\omega}{4e}\ \frac{\text{watts}}{\text{cm.}^3}=\frac{(20\times 10^{-8})^2\times 5^2\times 6.28\times 50}{4(8.85\times 10^{-11}}\cong 0.88\frac{\text{watt}}{\text{cm.}^3}$$

or slightly more than the values obtained previously.

Let us finally consider the efficiencies, as defined heretofore, of the two embodiments under consideration. Now, for $$RT\leq T\leq 250°\ \text{C.},\ E_1=\frac{\frac{1}{2}L_1^2(\Delta T_1)}{ke_o\rho C_{\text{SP}}}$$

and for the 5° C. peak region $$E_2=\frac{\frac{1}{2}L_2^2(\Delta T_2)}{ke_o\rho C_{\text{SP}}}$$

and therefore $$\frac{E_1}{E_2}=\frac{L_1^2(\Delta T_1)}{L_2^2(\Delta T_2)}$$

For $L_1=2.8\times 10^{-8}$ coul/cm.$^2$/° C. and $L_2=20\times 10^{-8}$ coul/cm.$^2$/° C., we obtain $$\frac{E_1}{E_2}\cong\frac{(2.8\times 10^{-8})^2}{(20\times 10^{-8})^2}\times\frac{250}{5}=0.98$$

and it can be seen that similar efficiencies of conversion are obtained in both cases.

We shall briefly examine the power out of a piezoelectric conversion which, as discussed previously, consists of the heating and cooling of components (wires, jig screws) to change their dimensions and so apply stresses to the piezoelectric members.

There are certain advantages to be gained by using piezoelectric instead of pyroelectric conversions:

(1) Negligible change in insulation resistance over the force range.

(2) Negligible change in dielectric constant ($\cong$10%) over the force range.

(3) Proper design of a stressing system may result in a higher frequency of applied stress.

(4) Finally, and probably most important, it is not inconceivable that systems may be designed so that resonace operation is obtained with a subsequent large lowering of the resistance of the piezoelectric elements.

The calculation of the piezoelectric power output proceeds along similar lines to the discussed piezoelectric calculation to the point $$W=\frac{Q^2_{\text{max.}}\ \omega}{4C}$$

but here Q is defined from a force range rather than a temperature interval. In the following discussions, we shall be concerned with the high temperature, lead titanate-zirconate material and its characteristics relevant to the problem under consideration. Upon high force, short time loading in the order of 1 millisecond, the type of dependence of peak charge release on peak pressure shown in FIGURE 8 is obtained. From curve 126 of FIGURE 8 the peak charge release at various forces can be determined.

Assuming we are working in the reversible range, $$W=\frac{Q^2_{\text{max.}}\ \omega}{4C}=\frac{Q^2_{\text{max.}}\ \omega}{4eA}\left(d\times\frac{A}{A}\right)=\frac{Q^2_{\text{max.}}\ \omega\ \text{vol}}{4eA^2}\ \text{or}\ \frac{W}{\text{vol}}=\frac{Q^2_{\text{max.}}\ \omega}{4eA^2}$$

Consider a sample of 1 cm.$^2$ area and 1cm. thick and assume we are working in a reversible force range where $7\times 10^{-6}$ coul/cm.$^2$ of charge is released and that we have a stressing rate of 1 c.p.s. Then $$\frac{W}{\text{vol}}=\frac{Q^2_{\text{max.}}\ \omega}{4eA^2}=\frac{(7\times 10^{-6})^2\times 6.28}{4\times 45\times 10^{-12}}=0.8$$

The units are:

$$\frac{\text{coul}^2}{\text{sec.}\ \frac{\text{farad}}{\text{cm.}}\ \text{cm.}^4}=\frac{\text{coul}^2}{\text{sec. farad cm.}^3}$$

Now $$1=\text{farad}=1\ \frac{\text{sec.}^2\ \text{coul}^2}{\text{kgm}^2}$$

and therefore $$\frac{\text{coul}^2}{\text{sec. farad cm.}^3}=\frac{\text{coul}^2\ \text{kgm}^2}{\text{sec. cm.}^3\ \text{sec.}^2\ \text{coul}^2}=\frac{\text{kgm}^2}{\text{cm.}^3\ \text{sec.}^3}$$

Since $$\text{watt}=\frac{\text{kgm}^2}{\text{sec.}^3}$$

the result is in watts/cm.$^3$. Thus we have a power to volume ratio of $$0.8=\frac{\text{watts}}{\text{sec.}^3}$$

which value is comparable to that which was obtained in the pyroelectric case. Note that in the above discussions we have not considered the power required to cycle our systems into and out of the heat sources (i.e., hot and cold baths, or hot and cold blowers) as this would depend on the sources of temperature available.

We shall now consider combining the piezoelectric and pyroelectric effects previously described. In FIGURES 9B and 9C are shown the polarity of the piezoelectric output of element 128 under compression and tension with respect to the poling polarity (FIGURE 9A). In FIGURES 10B and 10C are shown the polarity of the pyroelectric output of element 128 due to temperature rise and decrease with respect to the poling polarity (FIGURE and cooled fluid flows in the outer cylinder. During the second half of the cycle, the cooled fluid flows in the inner cylinder and the heated fluid flows in the outer cylinder. Since the piezoelectric and the pyroelectric effects are additive under these conditions, it is possible to obtain higher output voltages for a given temperature change.

It should be understood that the various types and numbers of elements, mechanical connections and electrical arrangements shown and described in the earlier embodiments may be modified to be used in conjunction with the embodiment of FIGURES 16 and 17. Moreover, the outputs of the ceramic elements are preferably connected in series as shown in FIGURE 15.

While we have disclosed our invention in relation to specific examples and in specific embodiments, we do not wish to be limited thereto, for obvious modifications will occur to those skilled in the art without departing from the spirit and scope of our invention.

We claim:

1. A system for generating electrical energy from a heat source comprising a plurality of stretched wires forming a grid, a plurality of ferrolectric ceramic bodies made of lead titanate-zirconate, one of said ceramic bodies being mechanically connected to one end of each of said wires such that said bodies are under stress in the absence of heat, means for directing heat energy from said heat source onto said wires to cause said wires to expand and cause the ceramic bodies attached to the ends thereof to move due to the reduction of the stress thereon and to produce an electrical potential from said ceramic bodies due to said motion, and means for connecting the outputs of said ceramic bodies in series additive relation.

2. A system for generating electrical energy from a heat source comprising a plurality of stretched wires forming a grid, a plurality of electromechanically sensitive bodies, one of said bodies being mechanically connected to one end of each of said wires such that said bodies are under stress in the absence of heat, means for directing heat energy from said source onto said wires to cause said wires to expand and cause the bodies attached to the ends thereof to move due to the reduction of the stress thereon and to produce an electrical potential from said bodies due to said motion, and means for connecting the outputs of said electromechanically sensitive bodies in series additive relation.

3. A thermoelectric generator comprising a pair of coaxial pipes, a plurality of wires stretched across the inner of said pipes, a second plurality of ferroelectric ceramic electromechanically sensitive bodies, one of said bodies being mechanically connected to one end of each of said wires such that there is a body connected to each end of each of said wires, said bodies being connected to said wires such that said bodies are under stress in the absence of heat applied to the wires, said ceramic bodies being mounted on the outer surface of the inner of said pair of pipes.

4. A system for generating electrical energy from a heated medium comprising: a piezoelectric body made of a material which provides an electrical output when the body is subjected to a change in stress, a taut wire connected at one end to said piezoelectric body, said wire placing said piezoelectric body under an initial stress and changing the stress of said body upon expansion or contraction thereof in response to a change in the temperature of the medium, and means for directing heat from said medium to said wire.

5. The system of claim 4 wherein there is provided means for insulating said piezoelectric body from said heated medium.

6. The system described in claim 4 wherein said piezoelectric body comprises lead titanate-zirconate.

7. The system of claim 4 wherein said wire is tungsten.

8. A system for generating electrical energy from heat comprising: a conduit for the flow of a heated medium, a piezoelectric body supported on the outside of said conduit, a wire attached to one end of said piezoelectric body and extending inside and across said conduit where the heat from the heated medium in said conduit is caused to strike the wire and anchored on a side thereof opposite the side containing said piezoelectric body, said wire being taut to place said piezoelectric body under an initial stress.

9. A system for generating electrical energy comprising: a pair of plates, an electromechanically sensitive body sandwiched between said pair of plates, hollow connecting means connected between said pair of plates and through which fluid is passed to cause expansion or contraction thereof to vary the spacing between said plates to vary the stress in said electromechanically sensitive body, whereby the stress in said electromechanically sensitive body is increased when relatively cold fluid flows in said hollow connecting means and is decreased when relatively hot fluid flows through said connecting means, said increase and decrease in stress generating a varying electrical potential.

10. A system as described in claim 9 wherein said electromechanically sensitive body is a piezoelectric ceramic.

11. A system for generating electric flow as described in claim 9 wherein said connecting means comprises a pair of hollow screws passing through holes in said plates, and nuts threaded around said screws and bearing on the outside of said plates.

12. A system for generating electrical energy comprising: a pair of coaxial pipes, at least one wire stretched across the inner of said pipes, a piezoelectric body having normally opposing pyroelectric and piezoelectric effects, said wire being connected to one end of said wire and mounted on the outer surface of the inner of said pipes so that expansion or contraction of said wire will vary the stress in said piezoelectric body, whereby relatively hot and cold fluids may be simultaneously passed through said inner and outer pipes to subject said wire and said piezoelectric body to different temperature conditions to effect reinforcement of the pyroelectric and piezoelectric characteristics thereof.

13. A device for converting heat to electrical energy comprising: a housing for a heated medium, a piezoelectric element on the outside of said housing and insulated from the heat within said housing, and a wire connected at one end to said piezoelectric element and extending through the housing and anchored to the opposite side thereof so that the wire is taut and variation in the temperature thereof will vary the stress of said piezoelectric element.

References Cited by the Examiner

UNITED STATES PATENTS

| | | | |
|---|---|---|---|
| 2,004,421 | 6/1935 | Smulski | 310—4.1 X |
| 2,542,045 | 2/1951 | Minnich | 310—9 X |
| 2,659,829 | 11/1953 | Baerwald | 310—8.5 |
| 2,756,353 | 7/1956 | Samsel | 310—8.5 |
| 2,936,576 | 5/1960 | Black | 60—23 |

ORIS L. RADER, *Primary Examiner.*

MILTON O. HIRSHFIELD, *Examiner.*